United States Patent [19]

Takada

[11] Patent Number: 5,185,544
[45] Date of Patent: Feb. 9, 1993

[54] VENTILATION STRUCTURE IN A VERTICALLY MOUNTED MOTOR

[75] Inventor: Shigeru Takada, Kiryu, Japan

[73] Assignee: Mitsuba Electric Mfg. Co., Ltd., Japan

[21] Appl. No.: 857,450

[22] Filed: Mar. 25, 1992

[30] Foreign Application Priority Data

Mar. 25, 1991 [JP] Japan .................. 3-25786[U]

[51] Int. Cl.⁵ .................. H02K 9/26; H02K 7/08; F16C 19/50
[52] U.S. Cl. .................. 310/58; 310/56; 310/88; 310/157; 310/90; 384/476; 384/478
[58] Field of Search .................. 310/56, 58, 85, 88, 310/90, 157; 384/476, 478, 624; 277/25, 67, 133

[56] References Cited

U.S. PATENT DOCUMENTS

| | | | |
|---|---|---|---|
| 1,145,516 | 7/1915 | Schmid et al. | 384/478 |
| 2,059,872 | 11/1936 | Hull | 310/157 |
| 2,100,020 | 11/1937 | Andrews | 310/56 |
| 2,571,267 | 10/1951 | Ljunggren | 310/157 |
| 3,159,354 | 12/1964 | Yartz et al. | 310/157 |
| 3,486,050 | 12/1969 | Dederick | 310/90 |
| 4,586,880 | 5/1986 | Inao et al. | 417/424 |

FOREIGN PATENT DOCUMENTS

| | | | |
|---|---|---|---|
| 1921251 | 11/1970 | Fed. Rep. of Germany | 310/157 |
| 3012715 | 10/1981 | Fed. Rep. of Germany | 310/88 |
| 0672730 | 1/1930 | France | 310/88 |
| 0056141 | 3/1988 | Japan | 310/88 |
| 0556135 | 9/1943 | United Kingdom | 310/88 |

Primary Examiner—Emanual T. Voeltz
Assistant Examiner—C. LaBalle
Attorney, Agent, or Firm—Oliff & Berridge

[57] ABSTRACT

A ventilation structure in a vertically mounted motor is able to avoid clogging from accumulated brush abrasion dust. A ventilation path adapted to provide ventilation between the interior and the exterior of the motor casing is formed from a communication hole defined in a bottom portion of the motor casing, extending between the exterior of the motor casing and a circular hole defined in the bottom portion of the motor casing; a communication groove defined in an annular rib, extending upwardly from the bottom portion of the motor casing to form a bearing seat and encircling the circular hole to bypass the bearing in the bearing seat; and a gap C defined between the annular rib and a cap member covering the bearing and annular rib.

10 Claims, 4 Drawing Sheets

VENTILATION STRUCTURE IN A VERTICALLY MOUNTED MOTOR

BACKGROUND OF THE INVENTION

1. Field of the Invention

The present invention relates to a ventilation structure in a vertically mounted motor which is attached to electric equipment for vehicles and the like.

2. Description of the Related Art

In general, conventional so-called vertically mounted type motors having core shafts oriented in the vertical direction are known. These vertically mounted motors have a case bracket forming a bottom portion of a motor casing and a lower end portion of the core shaft which projects downwardly through a lower case bracket to form an output shaft. A bearing located on an upper side of the lower case bracket for rotatably supporting the core shaft relative to the case bracket and a seal member located on a lower side of the lower case bracket to prevent the intrusion of foreign matters such as oil, dust and dirt are interposed between the case bracket and the lower end portion of the core shaft.

In these conventional vertically mounted and sealed motors, a ventilation path is defined in the motor casing to ensure that the pressure inside the casing is always equal to the ambient atmospheric pressure. The ventilation path is usually provided in the case bracket forming the bottom portion of the motor casing. However, because abrasion dust from a brush held in sliding contact with a commutator accumulates over an upper surface of the bottom portion of the motor casing, the ventilation path is likely to clog with the accumulated abrasion dust, which results in a failure to obtain a sufficient amount of ventilation in the motor casing.

SUMMARY OF THE INVENTION

An object of the present invention is to provide a ventilation structure in a vertically mounted motor which can ensure that sufficient ventilation to the motor casing is provided. Specifically, the present invention provides a ventilation structure in a vertically mounted motor arranged such that between an inner peripheral surface of a case bracket forming a bottom portion of a motor casing and the lower end portion of a vertical core shaft projecting downwardly though a lower case bracket to form an output shaft, a bearing located on an upper side for rotatably supporting said core shaft relative to the case bracket and a seal member located on a lower side for preventing intrusion of foreign matters such as oil, dust and dirt are interposed. The ventilation structure comprises an annular rib, projecting upwardly in the form of a ring from the upper surface of said case bracket, to support the outer periphery of the bearing located on the upper side, and to define a deposit portion or well, for collecting the brush abrasion dust deposited over the upper surface of the case bracket, on the outer peripheral side of the annular rib; a communication hole extending from the inner peripheral surface of the case bracket at a position between the bearing supporting region and the seal member supporting region to the outer peripheral surface of the case bracket by radially penetrating the case bracket; a communication groove defined in the inner peripheral surface of the annular rib for communicating the upper and lower sides of said bearing with each other; and a cap member integrally provided on the core shaft in a covering relation extending from above said bearing to outside the outer peripheral surface of said annular rib, with a gap being left relative to said annular rib. Accordingly, a ventilation path adapted to provide ventilation between the interior and exterior of the motor casing comprises a path leading from the communication hole defined in the case bracket, the communication groove defined in the annular rib and the gap defined between the annular rib and the cap member.

With the above arrangement of the present invention, the ventilation path in the vertically mounted motor can avoid becoming clogged with the brush abrasion dust.

BRIEF DESCRIPTION OF THE DRAWINGS

The present invention will be described in detail with reference to the following figures, wherein.

DETAILED DESCRIPTION OF THE PREFERRED EMBODIMENTS

Figure 1:
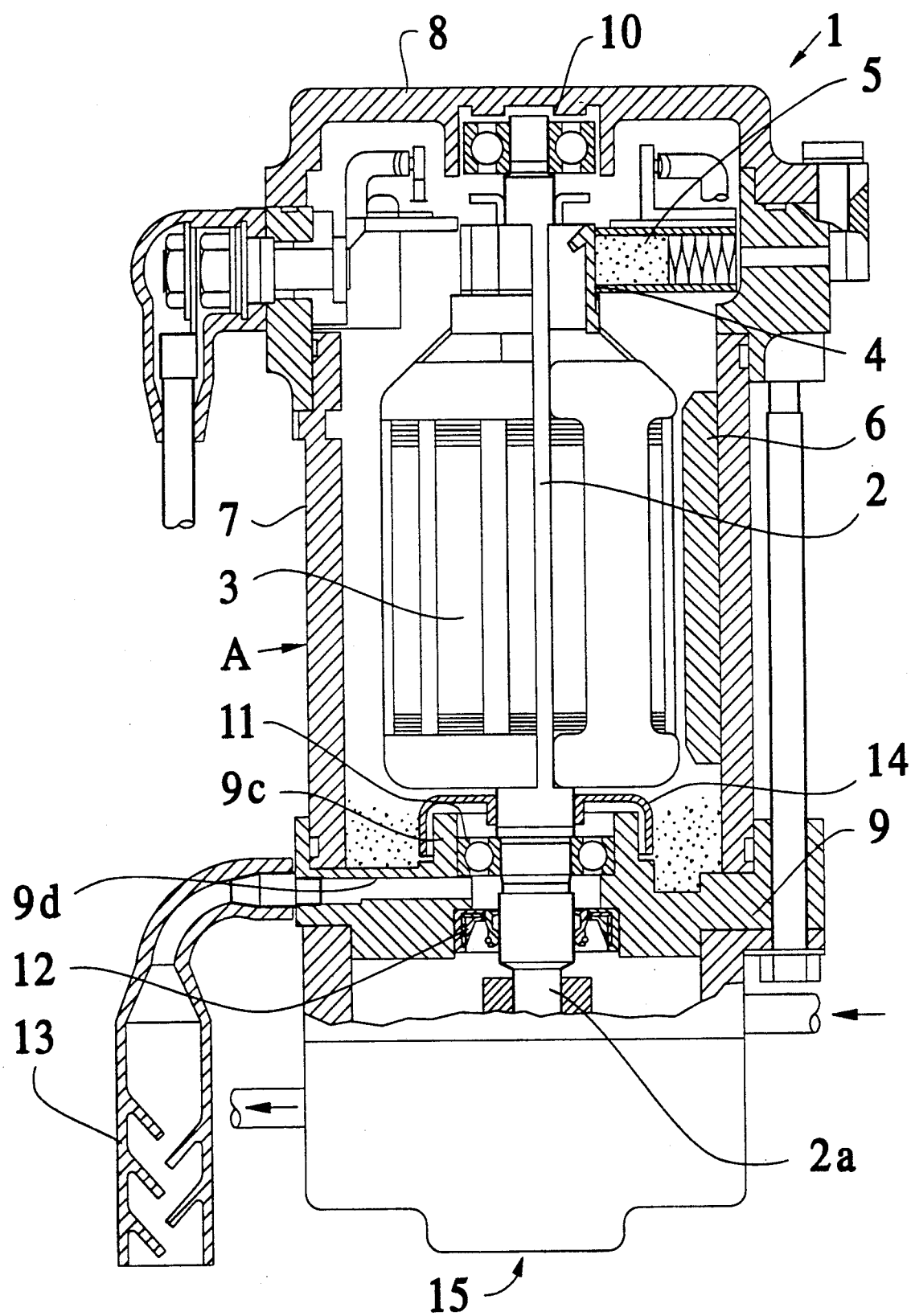
FIG. 1 is a sectional view of a vertically mounted motor.

A first preferred embodiment of the present invention will be described with reference to FIGS. 1 and 2. As shown in FIG. i, a motor 1 drives a hydraulic pump 15 or the like. The motor 1 is of the so-called vertically mounted type, having a core shaft 2 oriented in the vertical direction, and comprises a rotor core 3, a commutator 4, a brush 5 and a permanent magnet 6, as is conventionally known in the art. A casing A of the motor 1 is formed by integrally assembling upper and lower case brackets 8 and 9, respectively, to upper and lower open ends of a cylindrical yoke 7. An upper end portion of the core shaft 2 is rotatably supported by the upper case bracket 8 via a first bearing 10.

Figure 2:
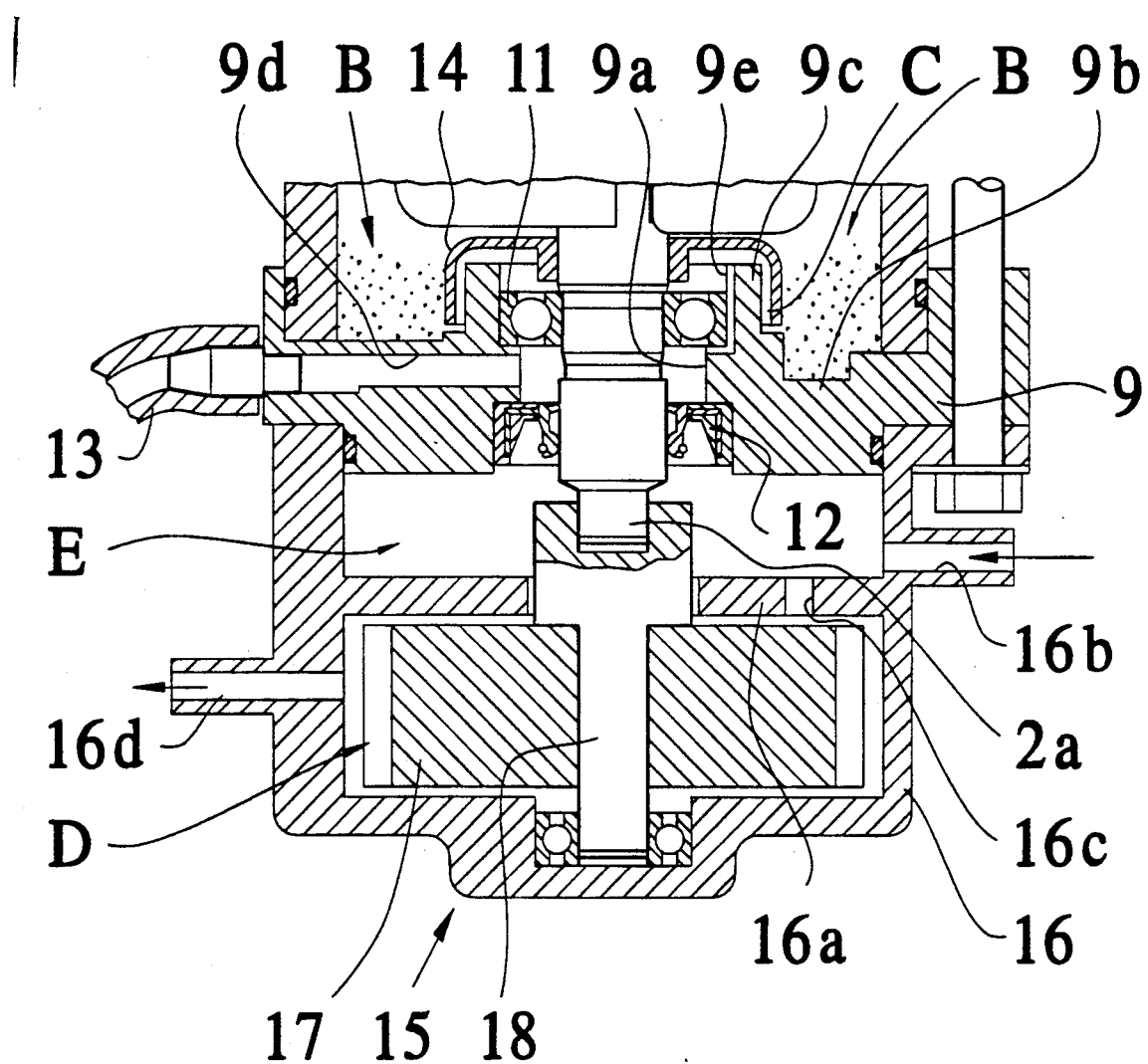
FIG. 2 is a sectional view of a principal part of the vertically mounted motor shown in FIG. 1.

The lower case bracket 9 is formed at the center thereof with a cylindrical opening to define an inner peripheral surface 9a, as shown in FIG. 2. A lower end portion of the core shaft 2 extends downwardly to penetrate the inner peripheral surface 9a, the lower end portion serving as an output shaft 2a of the motor. Between the inner peripheral surface 9a of the lower case bracket 9 and the lower end portion of the core shaft 2, a second bearing 11 and an oil seal 12 are interposed. The bearing 11 is a sealed type bearing and rotatably supports the core shaft 2 relative to the lower case bracket 9. The oil seal 12 prevents the intrusion of oil and the like. The bearing 11 and the oil seal 12 are arranged such that the bearing 11 is positioned on an upper side of the lower case bracket 9 and the oil seal 12 is positioned in a lower side of the lower case bracket 9. An outer peripheral surface of the second bearing 11 is supported by a bearing seat formed by an inner peripheral surface of an annular rib 9c which projects upwardly in the form of a ring from an upper surface 9b of the lower case bracket 9. A deposit well B, where abrasion dust produced from the brush accumulates, is defined by the upper surface 8b, an outer peripheral surface of the annular rib 9c and an inner peripheral surface of cylindrical yoke 7.

The lower case bracket 9 also has a communication hole 9d defined through the lower case bracket 9, which radially penetrates from the inner peripheral surface 9a to an outer peripheral surface of lower case bracket 9. More specifically, the communication hole 9d is formed in such a manner as to extend from a region of the inner peripheral surface 9a between the bearing 11 and the oil seal 12 to the outer peripheral surface of the lower case bracket 9 while passing below the abrasion dust deposit well B. A labyrinth tube 13 is fixedly secured at a base end thereof to an outer end of the communication hole 9d. A vertical communication groove 9e is formed in the bearing seat of the inner peripheral surface of the annular rib 9c to permit ventilation between upper and lower sides of the bearing 11. A cap member 14 is integrally secured to the lower end portion of the core shaft 2. The cap member 14 has a substantially cylindrical shape and forms a top wall extending above and radially outwardly of bearing 11 and the outer peripheral surface of the annular rib 9c. A gap C is defined between an inner surface of the cap member 14 and an outer surface of the annular rib 9c. Thus, a ventilation path is defined, which extends from the labyrinth tube 13 to the abrasion dust deposit well B via the communication hole 9d, the communication groove 9e and the gap C.

In addition, a hydraulic pump 15 has a casing 16 which is secured to a lower surface of the lower case bracket 9. An oil reservoir chamber E is formed between an upper wall 16a of a pump chamber D and the case bracket 9. An oil inlet port 16b communicates with the oil reservoir chamber E. Oil flowing into the oil reservoir chamber E through oil inlet port 16b enters the oil inflow side of the pump chamber D via a communication hole 16c defined through the upper wall 16a. The oil is forcibly moved to the oil outflow side of the pump chamber D by the rotation of a pump rotor 17, and delivered through an oil outlet port 16d. The output shaft 2a of the motor and the pump rotor 17 are operatively coupled to each other via a boss shaft 18 so that a drive force of the motor 1 is transmitted to the hydraulic pump 15.

In the first preferred embodiment of the present invention as set forth above, when the motor 1 is driven, the oil is forcibly delivered. During the operation of the vertically mounted motor 1, ventilation between the interior and exterior of the casing A is established through the ventilation path leading from the labyrinth tube 13 to the abrasion dust deposit well B via the communication hole 9d, the communication groove 9e and the gap C, whereby the inner pressure of the casing A can be always held substantially equal to the ambient atmospheric pressure.

In this way, the ventilation path is formed in casing A so as to provide ventilation between the interior and the exterior thereof. More specifically, the ventilation path is formed to avoid opening directly into the abrasion dust deposit well B, by comprising the gap C between the annular rib 9c (which projects upwardly from the upper surface 8b, over which the abrasion dust deposit well B is defined) and the cap member 14 covering the annular rib 9c and the communication hole 9d, connected by the communication groove 9e on the inner peripheral side of the annular rib 9c. Therefore, the abrasion dust accumulated in the abrasion dust deposit well B can clog the ventilation path only when the abrasion dust is so heaped up as to entirely close the circumferential gap C between the annular rib 9 and the cap member 14. In practical use, however, it cannot be assumed that such a condition will occur. Even if the abrasion dust accumulates to grow into a heap, the dust heap is demolished or leveled by the cap member 14, which rotates with the motor. As a result, unlike the prior art, the brush abrasion dust can be prevented from clogging the communication hole and impairing the ventilation capability.

Additionally, with the first preferred embodiment, because the cap member 14 is arranged in covering relation with the second bearing it is also possible to positively avoid the drawback of the abrasion dust from the brush 5 dropping from above and entering the second bearing and eventually impairing the function of supporting the core shaft in a smooth rotatable manner.

Moreover, in the arrangement of the first preferred embodiment, including the oil reservoir chamber E defined below the lower case bracket 9, even if the oil in the oil reservoir chamber E breaks the sealed condition held by the oil seal 12 and enters the interior of the casing A, the entered oil flows into the communication hole 9d defined under the second bearing 11 and is then discharged to the exterior, making it possible to effectively prevent the oil from adhering to the second bearing 11. As a result, the second bearing 11 can be effectively protected from the oil entering from below, the dust entering from above and the resulting seizure of the second bearing 11 can be avoided.

Figure 3:
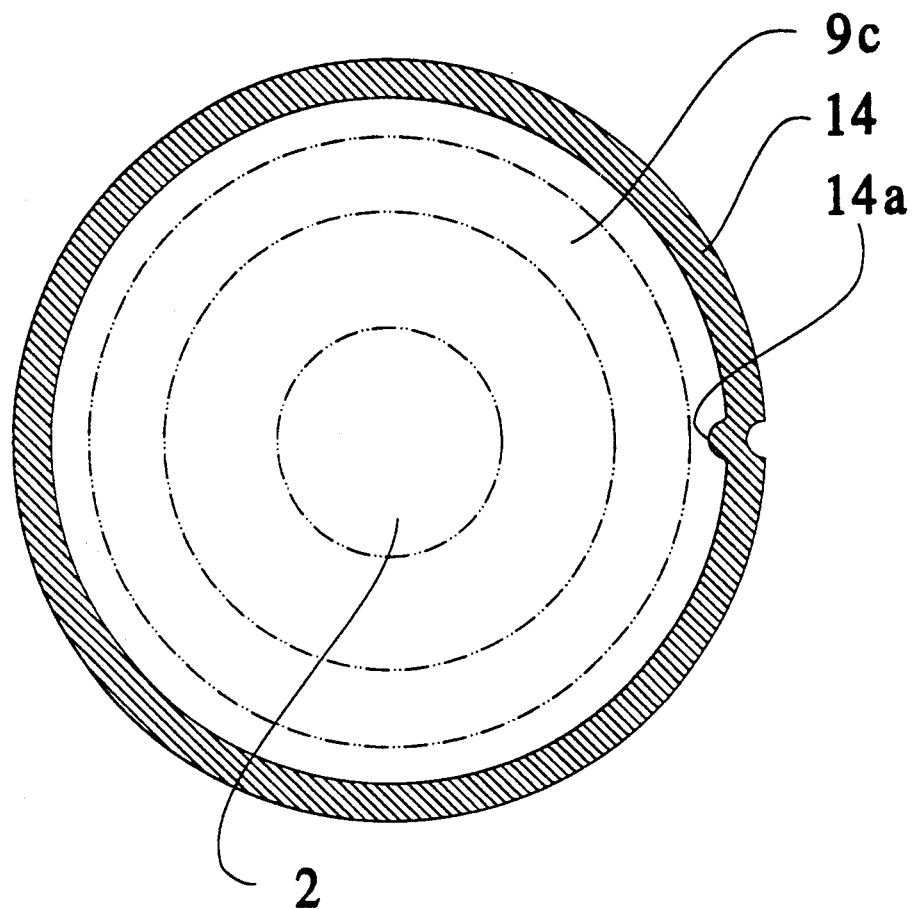
FIG. 3 is a sectional view through the plane 3—3 in FIG. showing an alternative embodiment of the vertically mounted motor of the present invention.
Figure 4:
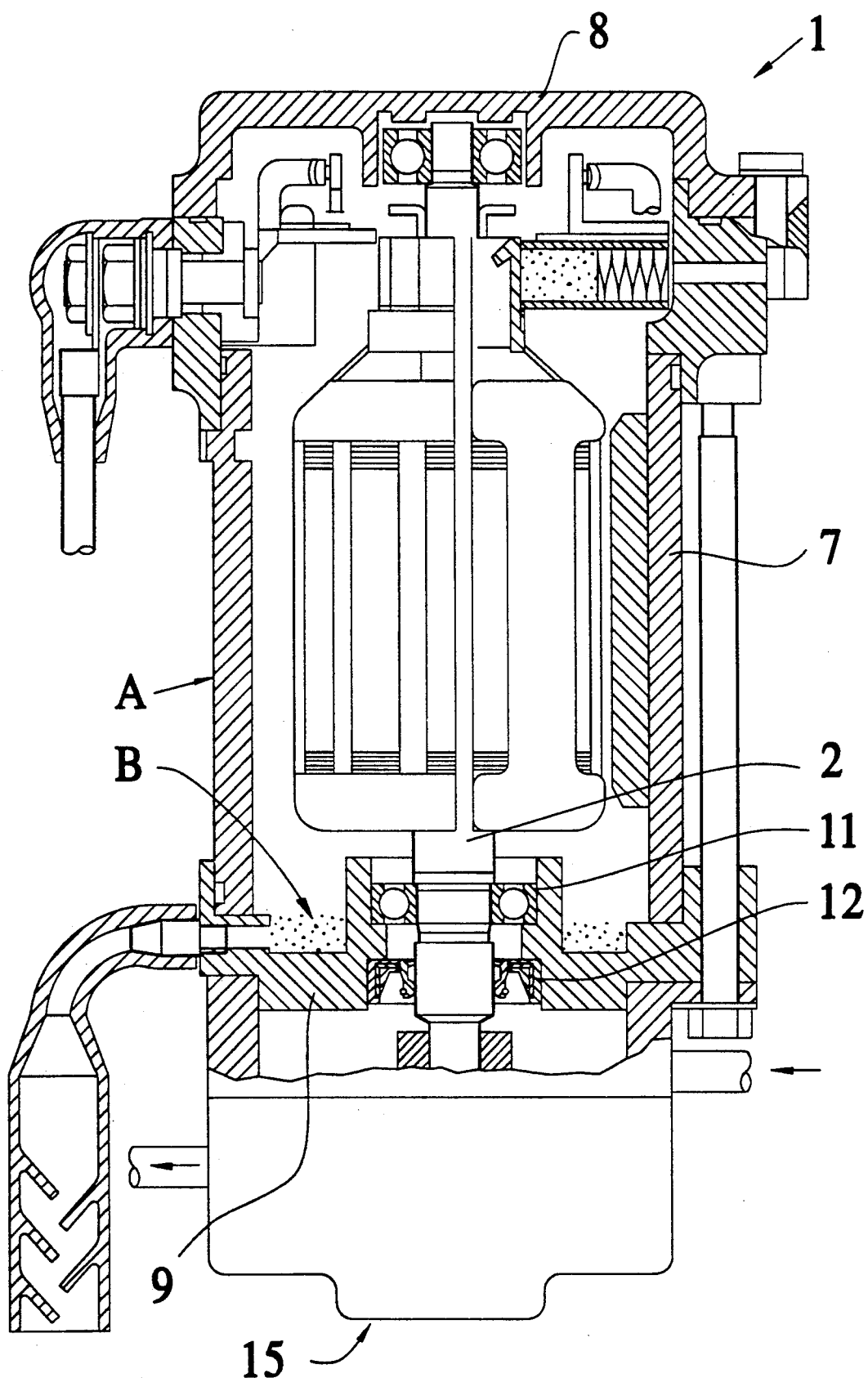
FIG. 4 is a sectional view of a conventional vertically mounted motor.

In a second embodiment of the present invention, the cap member 14 is modified to provide a projection 14a on an inner surface of the cap member 14 in close relation to the annular ring 9c, as shown in FIG. 3. The second preferred embodiment provides for a mechanism to remove the abrasion dust tending to adhere to the outer peripheral surface of the annular rib 9c, by forcibly peeling the adhered dust off the projection 14a by continually reducing the gap C as the gap member 14 rotates with the motor.

In short, according to the second preferred embodiment of the present invention as set forth above, a ventilation path is formed in a motor casing so as to provide ventilation between the interior and the exterior thereof, the ventilation path being formed to avoid extending directly into an abrasion dust deposit well, as in the conventional vertically-oriented motors, but to extend from a gap between an annular rib projecting upwardly from an upper surface of a lower case bracket, over which the abrasion dust deposit well is defined, and the cap member covering the annular rib, to a communication hole through a communication groove on the inner peripheral side of the annular rib. Therefore, the abrasion dust accumulated in the abrasion dust deposit well can clog the ventilation path only when the abrasion dust is so heaped up as to entirely close the circumferential gap between the annular rib and the cap member. In practical use, however, it cannot be assumed that such a condition will occur. Even if the abrasion dust accumulates into a heap, the dust heap is demolished or leveled by the cap member, which rotates with the motor. Consequently, unlike the conventional vertically-oriented motors, the brush abrasion dust can be prevented from clogging the communication hole and impairing the ventilation capability of the motor. In addition, since the gap member serves to prevent the brush abrasion dust from dropping down into the bearing from the above, the bearing can be protected with the more satisfactory result, making it possible to prevent any impairment of the function of the bearing supporting the core shaft in a smooth rotatable manner.

What is claimed is:

1. A vertically mounted motor, comprising:
   a cylindrical yoke having at least an open lower end;
   a lower case bracket attached to and closing the open lower end of the cylindrical yoke;
   a circular opening defined in a center of the lower case bracket by an inner peripheral surface of the lower case bracket;
   a rotatable vertical core shaft projecting downwardly through an interior of the cylindrical yoke and through the circular opening of the lower case bracket;
   an annular rib provided on an upper surface of the lower case bracket, extending into the cylindrical yoke and encircling the circular opening;
   a bearing seat formed in an inner peripheral surface of the annular rib;
   a bearing for rotatably supporting the core shaft, positioned in the bearing seat;
   a ventilation passage defined in the lower case bracket, extending radially from the inner peripheral surface of the lower case bracket to an outer peripheral surface of the lower case bracket;
   a communication groove formed on the bearing seat, extending axially from the circular opening to the interior of the cylindrical yoke; and
   a cap member positioned axially above the annular rib for capping and shielding the annular rib and the bearing from falling debris, defining a circumferential gap between the annular rib and the cap
   wherein the upper surface of the lower case bracket, an outer peripheral surface of the annular rib, and an inner peripheral surface of the cylindrical yoke define a debris well for collecting and storing falling debris, wherein the ventilation passage, communication groove and the gap define a ventilation path connecting an interior of the motor with an exterior of the motor.

2. The vertically mounted motor of claim 1, further comprising a seal seat defined in a lower portion of the inner peripheral surface of the circular opening;
   a seal member positioned in the seal seat and encircling the core shaft;
   wherein the ventilation passage extends from the inner peripheral surface of the circular opening in a region between the bearing seat and the seal seat.

3. The vertically mounted motor of claim 2, further comprising a hydraulic pump casing attached to a lower surface of the lower case bracket.

4. The vertically mounted motor of claim 3, wherein the seal member is an oil seal, and the hydraulic pump casing comprises:
   a cylindrical wall having a lower sealed end;
   a dividing wall radially above the sealed end dividing the pump casing into an oil chamber and a pump chamber, a circular opening defined in the center of the dividing wall;
   an oil passage defined in the dividing wall to connect the oil chamber and the pump chamber;
   a first passage defined in the cylindrical wall to connect the oil chamber with an exterior of the pump casing;
   a second passage defined in the cylindrical wall to connect the pump chamber with the exterior of the pump casing;
   a boss shaft fixedly attached to the vertical core shaft of the motor and extending from the oil chamber to the pump chamber through the circular opening in the dividing wall; and
   a pump rotor positioned in the pump chamber and attached to the boss shaft.

5. The vertically mounted motor of claim wherein the cap member is fixedly attached to the core shaft.

6. The vertically mounted motor of claim 5, wherein the cap member further comprises:
   a first portion extending radially from the core shaft; and
   a second portion positioned radially outside of the annular rib attached to a radial outward edge of the first portion and extending axially downwardly into the debris well.

7. The vertically mounted motor of claim 5, wherein the cap member further comprises a projection formed on the cap member and extending into the gap, such that any debris from the debris well entering the gap is ejected back into the debris well.

8. The vertically mounted motor of claim 1, further comprising:
   an upper case bracket attached to an upper end of the cylindrical yoke;
   a second bearing seat formed in the upper case bracket;
   a bearing for rotatably supporting an upper end of the core shaft and positioned in the bearing seat;
   at least one commutator attached to the core shaft axially below the upper end of the core shaft;
   a rotor core attached to the core shaft and positioned between the at least one commutator and the cap member;
   at least one permanent magnet attached to the inner peripheral surface of the cylindrical yoke opposite the rotor core; and
   a wearable brush attached to the cylindrical yoke and in sliding contact with the commutator, such that as the brush wears, the falling debris forms and falls from the brush.

9. The vertically mounted motor of claim 8, wherein one of the upper case bracket and the lower case bracket is integrally formed with the cylindrical yoke.

10. A vertically mounted motor, comprising:
    a motor casing having a vertical wall and a horizontal wall, the vertical wall having an outer vertical surface and an inner vertical surface, and the horizontal wall having a horizontal inner surface and a horizontal outer surface;
    a circular opening defined in the horizontal wall, having an inner peripheral surface;
    an annular wall provided on the horizontal inner surface of the horizontal wall about the circular opening and having an inner annular surface and an outer annular surface;
    a debris well defined by the inner vertical surface, the inner horizontal surface and the outer annular surface;
    a ventilation passage defined in the horizontal wall, extending between the outer vertical surface and the inner peripheral surface, connecting the circular opening with an exterior of the motor casing, a core shaft extending axially through the motor casing and extending axially outwardly of the motor casing through the circular opening;
    a bearing seat formed in the inner annular surface;
    a bearing for rotatably supporting the core shaft positioned in the bearing seat;
    a communication groove provided in the bearing seat and connecting the circular opening with an interior of the motor casing;
    an annular cap member positioned axially inwardly from the annular wall for shielding the bearing and communication groove; and
    a circumferential gap defined annular wall and the cap member connecting the communication groove to the interior of the motor casing.

* * * * *